United States Patent
Nojiri et al.

(10) Patent No.: US 9,507,227 B2
(45) Date of Patent: Nov. 29, 2016

(54) LIQUID CRYSTAL PANEL AND LIQUID CRYSTAL DISPLAY

(71) Applicant: Mitsubishi Electric Corporation, Tokyo (JP)

(72) Inventors: Isao Nojiri, Tokyo (JP); Takeshi Shimamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/918,947

(22) Filed: Oct. 21, 2015

(65) Prior Publication Data

US 2016/0131950 A1   May 12, 2016

(30) Foreign Application Priority Data

Nov. 7, 2014   (JP) ................. 2014-226821

(51) Int. Cl.
*G02F 1/1345* (2006.01)
*G02F 1/1362* (2006.01)
*G02F 1/1339* (2006.01)

(52) U.S. Cl.
CPC ... *G02F 1/136204* (2013.01); *G02F 1/136286* (2013.01); *G02F 1/1339* (2013.01); *G02F 1/13452* (2013.01)

(58) Field of Classification Search
CPC .......................... G02F 1/1339; G02F 1/13452
USPC ................. 349/153, 190, 149–152
See application file for complete search history.

(56) References Cited

U.S. PATENT DOCUMENTS

| | | |
|---|---|---|
| 5,870,160 A | 2/1999 | Yanagawa et al. |
| 6,034,757 A | 3/2000 | Yanagawa et al. |
| 6,108,066 A | 8/2000 | Yanagawa et al. |
| 2010/0073587 A1* | 3/2010 | Satoh ................. G02F 1/13452 349/40 |
| 2015/0241745 A1 | 8/2015 | Tashiro |
| 2015/0241746 A1 | 8/2015 | Hashiguchi et al. |

FOREIGN PATENT DOCUMENTS

| | | |
|---|---|---|
| JP | H09-105918 A | 4/1997 |
| JP | 2008-046278 A | 2/2008 |

* cited by examiner

*Primary Examiner* — Thanh-Nhan P Nguyen
(74) *Attorney, Agent, or Firm* — Studebaker & Brackett PC (57) ABSTRACT

An edge portion of first ground wiring and an edge portion of second ground wiring are in contact with a space containing air having a relative dielectric constant smaller than a liquid crystal relative dielectric constant through an insulating film. An edge portion of common wiring and another edge portion of the first ground wiring are in contact with a sealing material having a relative dielectric constant smaller than the liquid crystal relative dielectric constant through the insulating film.

8 Claims, 5 Drawing Sheets

LIQUID CRYSTAL PANEL AND LIQUID CRYSTAL DISPLAY

BACKGROUND OF THE INVENTION

1. Field of the Invention

The present invention relates to a liquid crystal panel and a liquid crystal display that display image with liquid crystals.

2. Description of the Background Art

In general, a liquid crystal display includes an array substrate and a counter substrate bonded to each other through a sealing material. The array substrate is the substrate that includes, for example, a thin film transistor (TFT). The counter substrate is the substrate facing the array substrate. The space defined by, for example, the array substrate, the counter substrate, and the sealing material is filed with liquid crystals. In the periphery of the array substrate, the common wiring for supplying voltage for use in the driving of the liquid crystal display is located.

The liquid crystal displays in recent times are required to have a wide viewing angle. Thus, the liquid crystal displays commonly include liquid crystal panels employing the fringe field switching (FFS) mode. In the liquid crystal panel employing the FFS mode, both the pixel electrode and the common electrode that control the alignment of liquid crystals are located on the array substrate. The pixel electrode and the common electrode are stacked with the insulating film located therebetween. The pixel electrode or the common electrode, being one of the two electrodes that is located on the upper layer side, has slits. One of the surfaces of the array substrate that is in contact with liquid crystals is rubbed in the direction substantially parallel to the longitudinal direction of the slits.

In a case where the potential between the two electrodes mentioned above is the OFF potential, liquid crystal molecules forming liquid crystals are aligned in the direction substantially parallel to the longitudinal direction of the slits. Upon application of a potential greater than the OFF potential between the two electrodes, an electric field (a transverse electric field) is generated in the direction vertical to the long sides of the slits. In this case, the liquid crystal molecules rotate (laterally) in a plane parallel to the substrate along the electric field.

In such liquid crystal display, the angle of rotation of the liquid crystal molecules is controlled, whereby the amount of light transmission is controlled. Besides the FFS mode, the in-plane switching (IPS) mode is widely known as the mode of the liquid crystal panel having the structure including both the pixel electrode and the common electrode located on the array substrate.

The liquid crystal displays employing, for example, the FFS mode and the IPS mode are likely to have display defects caused by the electrically charged surface of the liquid crystal panels. Japanese Patent Application Laid-Open No. 09-105918 (1997) (FIG. 14) discloses the technique (hereinafter also referred to as "related art A") of preventing the occurrence of defective displaying resulting from electrification due to, for example, static electricity. In particular, according to the related art A, a conductive layer is formed on one of the surfaces of the upper substrate (counter substrate) that is not in contact with liquid crystals. The conductive layer is grounded. In other words, the conductive layer is connected to the earth terminal that is kept at the ground potential.

In recent years, there has been a growing demand for smaller and lighter display panels including narrower frames mainly as liquid crystal panels and organic electroluminescent (EL) panels. The display panels, such as the liquid crystal panels and the organic electroluminescent panels, including the touch functionality of receiving operations by users are becoming increasingly popular. With this trend, the display panels are more likely to malfunction due to electric discharge caused by static electricity accumulated in, for example, the human body.

As an example, the following describes the liquid crystal panel. In general, the common wiring is located in the periphery of the array substrate included in the liquid crystal panel. In many cases, the edge portion of the common wiring extends off the sealing material in plan view. Thus, electric charges reaching the periphery of the liquid crystal panel (array substrate) due to electric discharge caused by static electricity are more likely to be transmitted to the driver integrated circuit (IC) through the common wiring in the array substrate. The driver IC is, for example, a chip-on-glass (COG) mounted IC or a chip-on-film (COF) mounted IC on the circuit board electrically connected to the array substrate. The above-mentioned situation raises the possibility of, for example, a malfunction or a failure of the driver IC.

Japanese Patent Application Laid-Open No. 2008-046278 discloses the technique (hereinafter also referred to as "related art B") of preventing the liquid crystal panels (liquid crystal displays) from malfunctioning due to electric discharge. In particular, according to the related art B, the common wiring is located inward from the seal in plan view. The wiring (ground wiring) connected to the ground potential is located so as to surround the common wiring. The above-mentioned wiring is connected to the protruding portions located outside of the seal in plan view. The protruding portions are connected to the ground potential.

The malfunctions caused by static electricity can be eliminated or reduced to a greater extent by the related art B than by the related art A. Unfortunately, according to the related art B, one piece of wiring (ground wiring) surrounds the common wiring and is connected to the ground potential. Thus, according to the related art B, charges associated with electric discharge due to static electricity are more likely to be transmitted to the common wiring through the ground wiring. The common wiring is used to drive the liquid crystal panel (liquid crystal display). For example, various malfunctions would occur in the liquid crystal panel (liquid crystal display) if charges associated with electric discharge are transmitted to the common wiring. Such malfunctions include a failure of the liquid crystal panel. Thus, the related art B would raise the considerable possibility of malfunctions associated with electric discharge due to static electricity. To eliminate or reduce the occurrence of malfunctions associated with electric discharge, the transmittance of charges associated with electric discharge to the common wiring need to be eliminated or reduced.

SUMMARY OF THE INVENTION

The present invention has an object to provide a liquid crystal panel and a liquid crystal display capable of eliminating or reducing transmittance of charges associated with electric discharge due to static electricity to common wiring.

A liquid crystal panel according to one aspect of the present invention includes a display region for displaying image with liquid crystals and a peripheral region located in a periphery of the display region. The liquid crystal panel includes a first substrate for controlling the liquid crystal panel, a second substrate facing the first substrate, a sealing material and a connecting member that connect the first substrate and the second substrate, common wiring located in the peripheral region and used to drive the liquid crystal panel, and first ground wiring and second ground wiring located in the peripheral region and connected to a ground potential. On the common wiring, the first ground wiring, and the second ground wiring, an insulating film is located. The sealing material and the connecting member are located apart from each other on the insulating film. The common wiring, the first ground wiring, and the second ground wiring are located apart from each other in the peripheral region. The common wiring and the sealing material are located so as to surround the display region in plan view. The liquid crystals are located in a region defined by the first substrate, the second substrate, and the sealing material. The first ground wiring is located so as to surround the common wiring in plan view. The second ground wiring is located so as to surround the first ground wiring in plan view. The connecting member is located so as to surround the sealing material in plan view. A wiring edge being an edge of the second ground wiring farthest from the display region resides, in plan view, at a position farther from the display region than an edge of the connecting member farthest from the display region. A space is present between the sealing material and the connecting member. The space contains air having a relative dielectric constant smaller than a liquid crystal relative dielectric constant being a relative dielectric constant of the liquid crystals under application of an electric field. A first edge portion being a portion of the first ground wiring closest to the second ground wiring and a second edge portion being a portion of the second ground wiring closest to the first ground wiring are in contact with the space through the insulating film. The sealing material has a relative dielectric constant smaller than the liquid crystal relative dielectric constant. A third edge portion being a portion of the common wiring closest to the first ground wiring and a fourth edge portion being a portion of the first ground wiring closest to the common wiring are in contact with the sealing material through the insulating film.

Assume that the first edge portion of the first ground wiring and the second edge portion of the second ground wiring are in contact with a member having a relative dielectric constant greater than the relative dielectric constant of the space containing air through the insulating film. This configuration is also referred to as "tentative configuration Z1."

According to one aspect of the present invention, the first edge portion of the first ground wiring and the second edge portion of the second ground wiring are in contact with the space containing air having a relative dielectric constant smaller than the liquid crystal relative dielectric constant through the insulating film. The capacitance between the first ground wiring and the second ground wiring can be thus reduced compared to that of the tentative configuration Z1.

This can eliminate or reduce the migration of charges from the second ground wiring to the first ground wiring. If charges associated with electric discharge due to static electricity enter the second ground wiring, this configuration would eliminate or reduce the transmittance of the charges to the first ground wiring.

Assume that the liquid crystals are located, instead of the sealing material, in the region in which the sealing material is originally located. This configuration is also referred to as "tentative configuration Z2."

The third edge portion of the common wiring and the fourth edge portion of the first ground wiring are in contact with the sealing material having a relative dielectric constant smaller than the liquid crystal relative dielectric constant through the insulating film. The capacitance between the common wiring and the first ground wiring can be thus reduced compared to that of the above-mentioned tentative configuration Z2 under application of an electric field onto the liquid crystals.

This can eliminate or reduce the migration of charges from the first ground wiring to the common wiring. If charges associated with electric discharge due to static electricity enter the first ground wiring, this configuration would eliminate or reduce the transmittance of the charges to the common wiring.

Therefore, the present invention can eliminate or reduce the transmission of charges associated with electric discharge due to static electricity to the common wiring.

These and other objects, features, aspects and advantages of the present invention will become more apparent from the following detailed description of the present invention when taken in conjunction with the accompanying drawings.

DESCRIPTION OF THE PREFERRED EMBODIMENTS

With reference to the drawings, the following describes preferred embodiments of the present invention. In the description below, the same reference signs indicate the same constituent components, which holds true for the names and functions thereof. Therefore, the detailed description thereof may be omitted.

The dimension, the material, and the shape of each of the constituent components and the relative arrangement thereof illustrated in the preferred embodiments can be appropriately varied depending on the configuration of the apparatus having the present invention applied thereto and on various conditions, and the present invention is not limited to such illustration. The dimension of each constituent component shown in each of the drawings may vary from the actual dimension thereof.

First Preferred Embodiment

Figure 1:
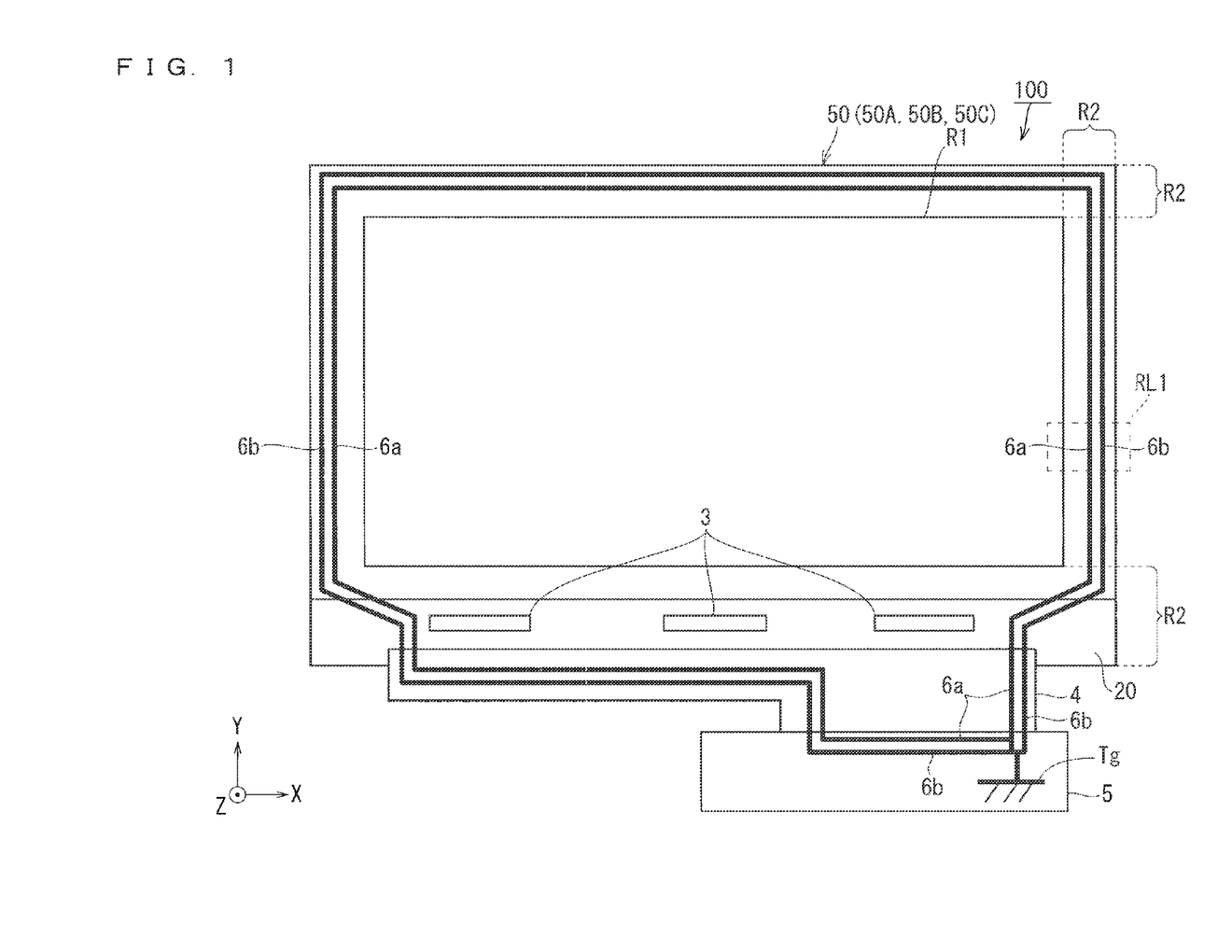
FIG. 1 is a plan view of a configuration of a liquid crystal display according to a first preferred embodiment of the present invention.

FIG. 1 is a plan view of a configuration of a liquid crystal display 100 according to a first preferred embodiment of the present invention. FIG. 1 mainly shows the arrangement state of ground wiring which will be described later.

With reference to FIG. 1, X, Y, and Z directions are orthogonal to one another. The X, Y, and Z directions indicated in the subsequent drawings are also orthogonal to one another. The direction including the X direction and the direction (−X direction) opposite to the X direction is hereinafter also referred to as "X axis direction." The direction including the Y direction and the direction (−Y direction) opposite to the Y direction is hereinafter also referred to as "Y axis direction." The direction including the Z direction and the direction (−Z direction) opposite to the Z direction is hereinafter also referred to as "Z axis direction."

The plane surface including the X axis direction and the Y axis direction is hereinafter also referred to as "X-Y plane." The plane surface including the X axis direction and the Z axis direction is hereinafter also referred to as "X-Z plane." The plane surface including the Y axis direction and the Z axis direction is hereinafter also referred to as "Y-Z plane."

Figure 2:
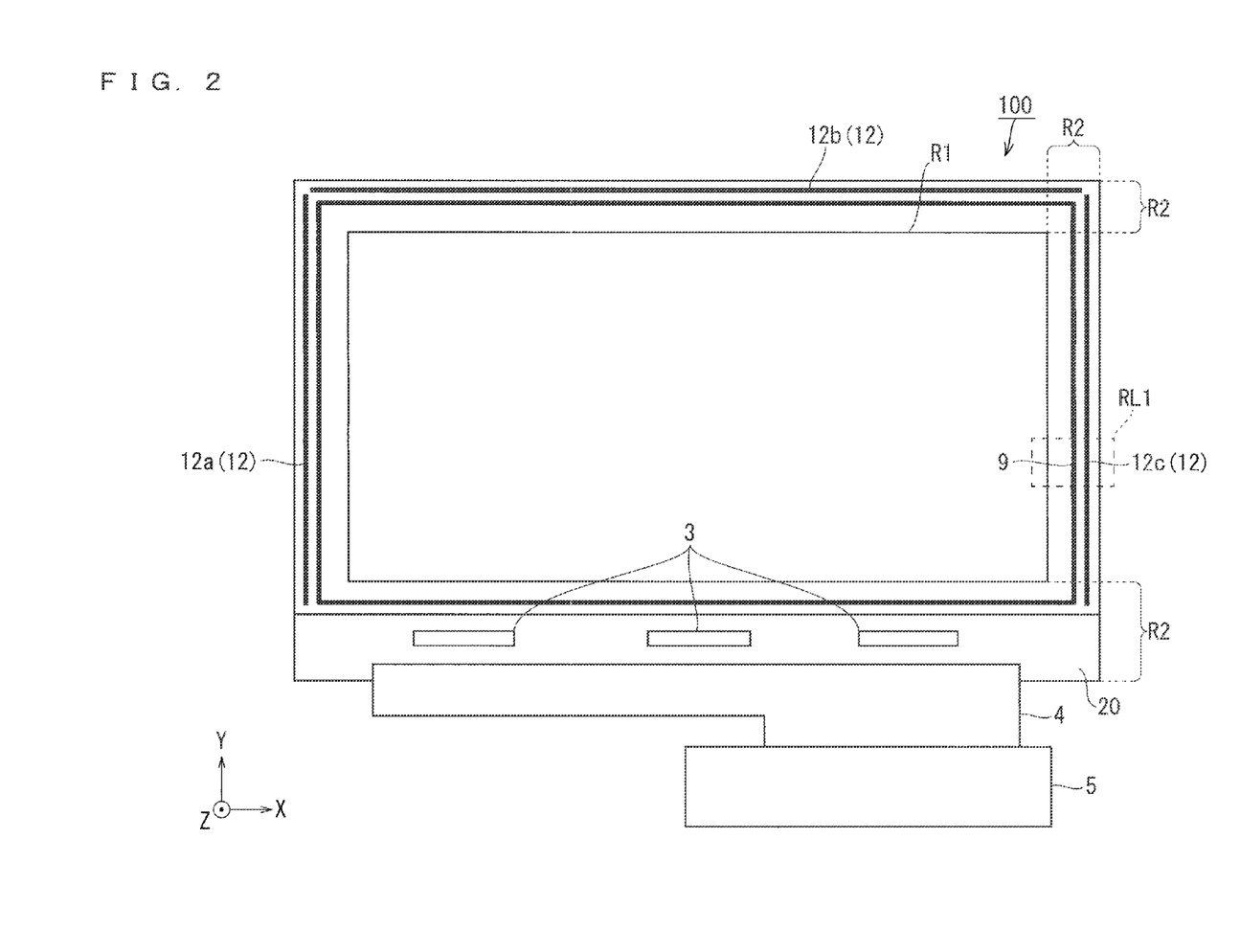
FIG. 2 is a plan view of a configuration of the liquid crystal display according to the first preferred embodiment of the present invention.
Figure 3:
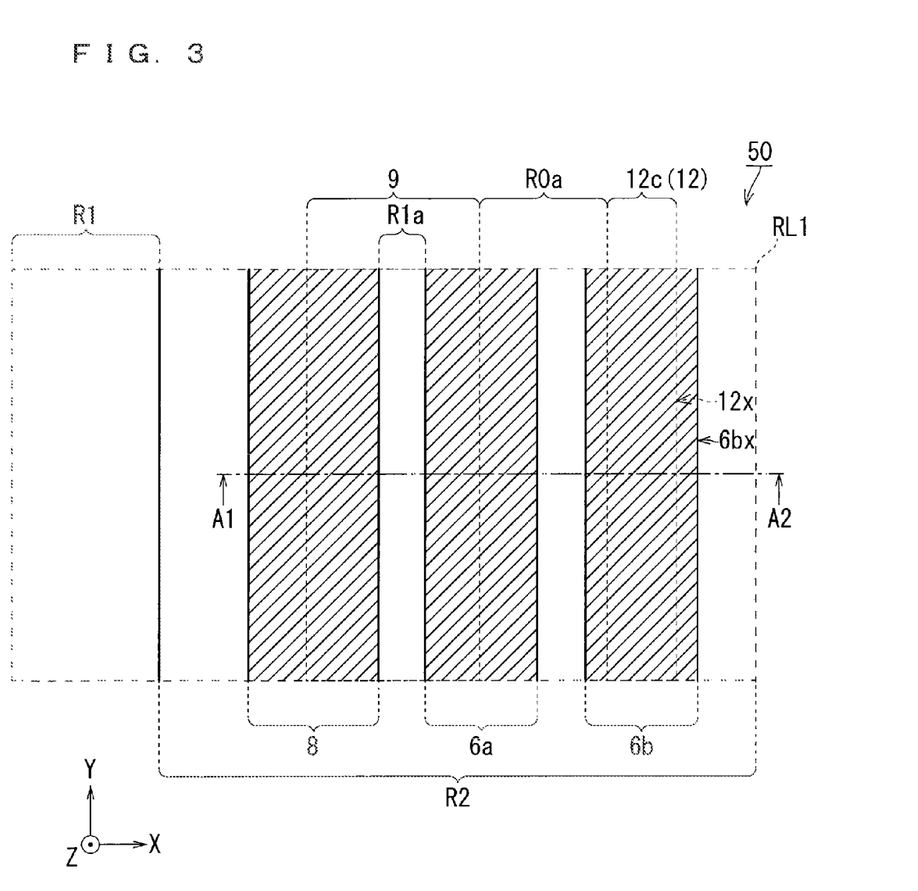
FIG. 3 is an enlarged view of a region shown in FIGS. 1 and 2.
Figure 4:
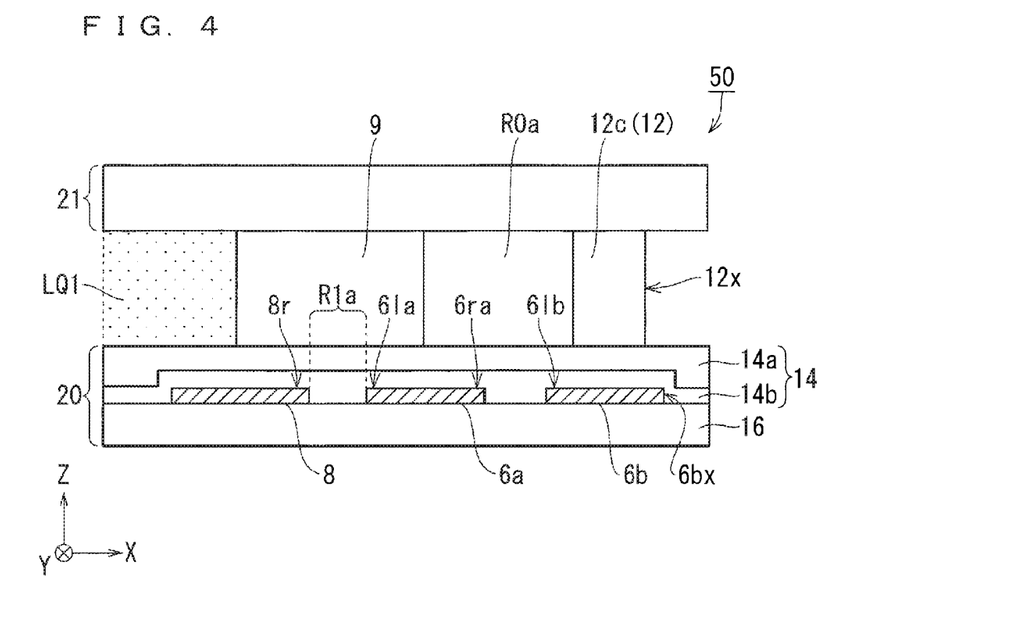
FIG. 4 is a cross-sectional view of a part of a liquid crystal panel included in the liquid crystal display.

FIG. 2 is a plan view of a configuration of the liquid crystal display 100 according to the first preferred embodiment of the present invention. FIG. 2 mainly shows the arrangement state of a sealing material which will be described later. FIG. 3 is an enlarged view of a region RL1 shown in FIGS. 1 and 2. FIG. 4 is a cross-sectional view of a part of a liquid crystal panel 50 included in the liquid crystal display 100. The liquid crystal 50 will be described later. In particular, FIG. 4 is a cross-sectional view of a liquid crystal panel 50 taken along the line A1-A2 shown in FIG. 3.

With reference to FIGS. 1, 2, and 4, the liquid crystal display 100 includes the liquid crystal panel 50, flexible printed circuits (FPCs) 4, and a circuit board 5. The liquid crystal display 100 controls the liquid crystal panel 50 to display image.

The liquid crystal panel 50, which will be described later in detail, is the panel that displays image. The liquid crystal panel 50 includes a display region R1 and a peripheral region R2. The display region R1 is the region in which the liquid crystal panel 50 displays image with liquid crystals. The display region R1 includes a plurality of pixels. The peripheral region R2 is formed in the periphery of the display region R1. In particular, the peripheral region R2 is the region surrounding the display region R1 in plan view (in the X-Y plane). The peripheral region R2 has a frame shape (a rectangular shape) in plan view (in the X-Y plane).

The liquid crystal panel 50 includes an array substrate 20, a counter substrate 21, a sealing material 9, and common wiring 8. The array substrate 20 is the substrate for controlling the liquid crystal panel 50. In particular, the array substrate 20 mainly includes a drive circuit 3 for controlling the liquid crystal panel 50. That is, the liquid crystal panel 50 is controlled by the drive circuit 3.

The drive circuit 3 is located in the peripheral region R2 of the array substrate 20. The drive circuit 3 is, for example, an IC. The drive circuit 3 is, for example COG mounted. The drive circuit 3 is connected to, for example, the wiring (not shown) extending from the inside of the display region R1. The drive circuit 3 controls the liquid crystal panel 50 to display image.

As shown in FIG. 4, the counter substrate 21 faces the array substrate 20. The array substrate 20 in plan view (in the X-Y plane) is larger than the counter substrate 21 in plan view (in the X-Y plane).

The sealing material 9 is the member for confining liquid crystals LQ1. With reference to FIGS. 2, 3, and 4, the sealing material 9 connects the array substrate 20 and the counter substrate 21 with a space therebetween in which the liquid crystals LQ1 are confined. The sealing material 9 is located in the peripheral region R2. That is, the sealing material 9 is located so as to surround the display region R1 in plan view (in the X-Y plane). Thus, the sealing material 9 has a frame shape (a rectangular shape) in plan view (in the X-Y plane). The sealing material 9 is made of, for example, resin. The resin is cured by irradiation with, for example, ultraviolet rays. The liquid crystals LQ1 are confined in the region (space) defined by the array substrate 20, the counter substrate 21, and the sealing material 9. Thus, the liquid crystals LQ1 are located in the region defined by the array substrate 20, the counter substrate 21, and the sealing material 9.

The common wiring 8 is used to drive the liquid crystal panel 50. The common wiring 8 is, for example, the wiring to supply voltage for causing the liquid crystal panel 50 to operate. The common wiring 8 is electrically connected to the electrode that is capacitively coupled with each of the pixels included in the display region R1 through the liquid crystals LQ1 upon application of voltage onto the liquid crystals LQ1. The common wiring 8 is electrically connected to the drive circuit 3.

The common wiring 8 is located in the peripheral region R2. In particular, the common wiring 8 is located so as to surround, in plan view (in the X-Y plane), the upper side, the left side, and the right side of the rectangle defining the display region R1 in FIG. 1. That is, the common wiring 8 in the peripheral region R2 is located so as to surround the display region R1 in plan view (in the X-Y plane).

The circuit board 5 is the board for controlling the liquid crystal panel 50. The circuit board 5 is connected to the liquid crystal panel 50 (the array substrate 20) through the FPCs 4. Thus, the liquid crystal panel 50 is connected to the circuit board 5. To be more specific, the FPCs 4 are electrically connected to the drive circuit 3 located on the array substrate 20. The FPCs 4 are electrically connected to the circuit board 5. Thus, the drive circuit 3 and the circuit board 5 are connected through the FPCs 4. Alternatively, the drive circuit 3 and the circuit board 5 may be connected through, for example, another interconnection instead of being connected through the FPCs 4.

As shown in FIG. 1, the circuit board 5 includes a grounding terminal Tg. The grounding terminal Tg is connected to the ground potential. Thus, the grounding terminal Tg is grounded.

In the display region R1 in FIG. 1, a plurality of interconnections (not shown) including a plurality of scanning lines, a plurality of signal lines, and the common wiring 8 are located so as to cross each other. In the vicinity of the intersections of the scanning lines and the signal lines, switching elements (not shown) such as TFTs are formed. As required, the switching elements perform the operation for applying, onto the liquid crystals LQ1, voltage needed to display image.

Next, the characteristic configuration of the liquid crystal panel 50 is described. The liquid crystal panel 50 further includes ground wiring 6a, ground wiring 6b, and connecting members 12a, 12b, and 12c.

As shown in FIG. 1, the ground wiring 6a and the ground wiring 6b are located in the peripheral region R2. The ground wiring 6a and the ground wiring 6b are located independent of the drive circuit 3. The common wiring 8, the ground wiring 6a, and the ground wiring 6b are located apart from each other in the peripheral region R2.

The ground wiring 6a and the ground wiring 6b, which will be described later in detail, are each connected to the ground potential. The ground wiring 6a in the peripheral region R2 is located so as to surround the common wiring 8 in plan view (in the X-Y plane). Thus, the common wiring 8 is located along the inner side of the ground wiring 6a in plan view (in the X-Y plane).

As shown in FIG. 1, the ground wiring 6b in the peripheral region R2 is located so as to surround the ground wiring 6a in plan view (in the X-Y plane).

As shown in FIG. 1, the ground wiring 6a and the ground wiring 6b each extend from the liquid crystal panel 50 to the circuit board 5 through the FPCs 4. The ground wiring 6a and the ground wiring 6b are each connected to grounding terminal Tg of the circuit board 5. Thus, the ground wiring 6a and the ground wiring 6b are each connected to the ground potential. Consequently, the majority of charges that have entered the ground wiring 6a and the ground wiring 6b due to electric discharge caused by static electricity migrate to the grounding terminal Tg.

The connecting members 12a, 12b, and 12c are the sealing materials connecting the array substrate 20 and the counter substrate 21. Unlike the sealing material 9, which is provided to confine the liquid crystals LQ1, the connecting members 12a, 12b, and 12c are provided to facilitate the propagation of charges associated with electric discharge due to static electricity to the ground wiring 6b.

The connecting members 12a, 12b, and 12c are located in the peripheral region R2 in plan view (in the X-Y plane). As shown in FIG. 2, the connecting members 12a, 12b, and 12c are located so as to surround the upper side, the left side, and the right side of the rectangle defining the sealing material 9. In particular, the connecting members 12a, 12b, and 12c are located so as to surround the sealing material 9 in plan view (in the X-Y plane).

Each of the connecting members 12a, 12b, and 12c is hereinafter also referred to as "connecting member 12." Thus, the connecting members 12 are located so as to surround the sealing material 9 in plan view (in the X-Y plane). Each of the connecting members 12 is made of the same material as that of the sealing material 9.

The connecting members 12a, 12b, and 12c may not be located independent of each other. For example, the connecting members 12a, 12b, and 12c may be connected to each other.

With reference to FIGS. 3 and 4, the following describes, in detail, the arrangement configuration of the common wiring 8, the ground wiring 6a, the ground wring 6b, the sealing material 9, and the connecting members 12. As described above, the common wiring 8, the ground wiring 6a, and the ground wiring 6b are located so as to surround the display region R1 in plan view (in the X-Y plane).

With reference to FIG. 4, the array substrate 20 includes an insulating film 14 and a substrate 16. The common wiring 8, the ground wiring 6a, and the ground wiring 6b are formed on the substrate 16. The insulating film 14 is located on the common wiring 8, the ground wiring 6a, and the ground wiring 6b. In particular, the insulating film 14 is laminated so as to cover the common wiring 8, the ground wiring 6a, the ground wiring 6b, and a part of the substrate 16. The insulating film 14 is, for example, 0.5 to 0.1 times as thick as the array substrate 20 including the insulating film 14.

The insulating film 14 includes an upper-layer insulating film 14a and a lower-layer insulating film 14b. The lower-layer insulating film 14b is located so as to cover the common wiring 8, the ground wiring 6a, the ground wiring 6b, and a part of the substrate 16. The upper-layer insulating film 14a is located on the lower-layer insulating film 14b.

The common wiring 8, the ground wiring 6a, and the ground wiring 6b are made of, for example, the same metal as that of the scanning lines and the signal lines in the display region R1. In particular, the common wiring 8, the ground wiring 6a, and the ground wiring 6b are made of, for example, aluminum or aluminum alloy.

The upper-layer insulating film 14a and the lower-layer insulating film 14b are each made of, for example, a nitride film (SiN) or an oxide film (SiO). The upper-layer insulating film 14a and the lower-layer insulating film 14b may be made of an organic film (such as a resin film).

The sealing material 9 and the connecting members 12 are located apart from each other on the insulating film 14 (the upper-layer insulating film 14a). As shown in FIGS. 3 and 4, the sealing material 9 is located so as to cover, through the insulating film 14, a region R1a between the common wiring 8 and the ground wiring 6a.

The edge of the ground wiring 6b farthest from the display region R1 in plan view (in the X-Y plane) is hereinafter also referred to as "wiring edge 6bx" (see FIGS. 3 and 4). The edge of the connecting member 12 farthest from the display region R1 in plan view (in the X-Y plane) is hereinafter also referred to as "member edge 12x" (see FIGS. 3 and 4).

As shown in FIGS. 3 and 4, the connecting member 12 has a width smaller than that of the ground wiring 6b. The connecting member 12 is located so as to cover the midsection of the ground wiring 6b in plan view (in the X-Y plane). Thus, the both edges of the ground wiring 6b lie off the corresponding edges of the connecting member 12.

As shown in FIGS. 3 and 4, the wiring edge 6bx of the ground wiring 6b resides, in plan view (in the X-Y plane), at a position farther from the display region R1 than the member edge 12x. That is, the wiring edge 6bx of the ground wiring 6b is located outside of the connecting member 12 in plan view (in the X-Y plane).

As shown in FIGS. 3 and 4, a space R0a containing air is present between the sealing material 9 and the connecting member 12. The space R0a contains air. The proportion of air contained in the space R0a is not limited to 100% and may, for example, range from 70% to 99%.

The air has a relative dielectric constant of 1.0. The relative dielectric constant is the value indicating the ease of charge transmission. The charge transmission is increasingly impeded as the relative dielectric constant decreases. In other words, the charge transmission is increasingly facilitated as the relative dielectric constant increases.

The relative dielectric constant of the liquid crystals LQ1 under application of an electric field on the liquid crystals LQ1 is hereinafter also referred to as "liquid crystal relative dielectric constant." Under application of an electric field onto the liquid crystals LQ1, the liquid crystal panel 50 is in the state of drive (hereinafter also referred to as "panel driving state) for image displaying. The liquid crystal relative dielectric constant is greater than or equal to 10. Thus, the space R0a contains air having a relative dielectric constant smaller than the liquid crystal relative dielectric constant that is greater than or equal to 10. The sealing material 9 has a relative dielectric constant smaller than the liquid crystal relative dielectric constant. For example, the sealing material 9 has a relative dielectric constant equal to or close to 3.

The portion of the ground wiring 6a closest to the ground wiring 6b is hereinafter also referred to as "edge portion 6ra" (see FIG. 4). The portion of the ground wiring 6b closest to the ground wiring 6a is hereinafter also referred to as "edge portion 6lb." The edge portion 6ra of the ground wiring 6*a* and the edge portion 6*lb* of the ground wiring 6*b* are in contact with the space R0*a* through the insulating film 14.

In general, charges associated with electric discharge due to static electricity in the vicinity of the liquid crystal panel enter the liquid crystal panel from the outer edge of the sealing material. In this preferred embodiment, the wiring edge 6*bx* resides, in plan view (in the X-Y plane), at a position farther from the display region R1 than the member edge 12*x* as described above. That is, the wiring edge 6*bx* is closer to the periphery of the liquid crystal panel 50 than the member edge 12*x*. Thus, the charges associated with electric discharge migrate from the member terminal 12*x* of the connecting member 12 to the grounding terminal Tg through the ground wiring 6*b*.

The ground wiring 6*b* has a given resistance value. Thus, charges entering the ground wiring 6*b* cause an increase in the potential of the ground wiring 6*b* for a brief moment. The ground wiring 6*b* and the ground wiring 6*a* are capacitively coupled by capacitance. Thus, the potential of the ground wiring 6*a* increases with increasing potential of the ground wiring 6*b*.

Assume that the edge portion 6*ra* of the ground wiring 6*a* and the edge portion 6*lb* of the ground wiring 6*b* are in contact with a member having a relative dielectric constant greater than the relative dielectric constant of a space R0*b* containing air through the insulating film 14. This configuration is hereinafter also referred to as "tentative configuration Z1."

In this preferred embodiment, the edge portion 6*ra* of the ground wiring 6*a* and the edge portion 6*lb* of the ground wiring 6*b* are in contact with the space R0*a* containing air having a relative dielectric constant smaller than the liquid crystal relative dielectric constant through the insulating film 14. The capacitance between the ground wiring 6*a* and the ground wiring 6*b* can be thus reduced compared to that of the above-mentioned tentative configuration Z1.

This can eliminate or reduce the migration of charges from the ground wiring 6*b* to the ground wiring 6*a*. If charges enter the ground wiring 6*b*, the potential of the ground wiring 6*a* increases to a lesser extent in this configuration than in the above-mentioned tentative configuration Z1. If charges enter the ground wiring 6*b*, this configuration would eliminate or reduce the transmittance of the charges to the ground wiring 6*a*.

The portion of the common wiring 8 closest to the ground wiring 6*a* is hereinafter also referred to as "edge portion 8*r*" (see FIG. 4). The portion of the ground wiring 6*a* closest to the common wiring 8 is hereinafter also referred to as "edge portion 6*la*" (see FIG. 4). The edge portion 8*r* of the common wiring 8 and the edge portion 6*la* of the ground wiring 6*a* are in contact with the sealing material 9 through the insulating film 14.

The ground wiring 6*a* and the common wiring 8 are capacitively coupled. Thus, the potential of the common wiring 8 increases with increasing potential of the ground wiring 6*a*. Assume that the liquid crystals LQ1 are located, instead of the sealing material 9, in the area in which the sealing material 9 is originally located. This configuration is hereinafter also referred to as "tentative configuration Z2."

In this preferred embodiment, the edge portion 8*r* of the common wiring 8 and the edge portion 6*la* of the ground wiring 6*a* are in contact with the sealing material 9 through the insulating film 14. As described above, the sealing material 9 has a relative dielectric constant smaller than the liquid crystal relative dielectric constant mentioned above. In the panel driving state mentioned above, the capacitance between the common wiring 8 and the ground wiring 6*a* can be reduced compared to that of the above-mentioned tentative configuration Z2 under application of an electric field onto the liquid crystals LQ1.

This can eliminate or reduce the migration of charges from the ground wiring 6*a* to the common wiring 8 in the panel driving state mentioned above. If charges enter the ground wiring 6*a* in the panel driving state, the potential if the common wiring 8 would increase to a lesser extent in this configuration than in the tentative configuration Z2.

Thus, if charges associated with electric discharge due to static electricity enter the ground wiring 6*b*, this configuration would eliminate or significantly reduce the transmittance of the charges to the common wiring 8. If charges enter the ground wiring 6*b*, the potential of the common wiring 8 hardly varies. This can prevent the occurrence of malfunctions or failures of various circuits (such as the drive circuit 3) connected to the common wiring 8.

As described above, in this preferred embodiment, the edge portion 6*ra* of the ground wiring 6*a* and the edge portion 6*lb* of the ground wiring 6*b* are in contact with the space R0*a* containing air having a relative dielectric constant smaller than the liquid crystal relative dielectric constant through the insulating film 14. Thus, the capacitance between the ground wiring 6*a* and the ground wiring 6*b* can be reduced compared to that of the above-mentioned tentative configuration Z1.

This can eliminate or reduce the migration of charges from the ground wiring 6*b* to the ground wiring 6*a*. If charges associated with electric discharge due to static electricity enter the ground wiring 6*b*, this configuration can eliminate or reduce the transmittance of the charges to the ground wiring 6*a*.

The edge portion 8*r* of the common wiring 8 and the edge portion 6*la* of the ground wiring 6*a* are in contact with the sealing material 9 having a relative dielectric constant smaller than the liquid crystal relative dielectric constant through the insulting film 14. The capacitance between the common wiring 8 and the ground wiring 6*a* can be thus reduced compared to that of the above-mentioned configuration Z2 under application of an electric field onto the liquid crystals LQ1.

This configuration can eliminate or reduce the migration of electric charges from the ground wiring 6*a* to the common wiring 8. If charges associated with electric discharge due to static electricity enter the ground wiring 6*a*, this configuration can eliminate or reduce the transmittance of the charges to the common wiring 8.

Thus, this preferred embodiment can eliminate or reduce the transmittance of charges associated with electric discharge due to static electricity to the common wiring. In the event of the occurrence of electric discharge caused by static electricity, the liquid crystal panel 50 (the liquid crystal display 100) would be prevented from malfunctioning.

In this preferred embodiment, the ground wiring 6*a* and the ground wiring 6*b* are located so as to surround the outer side of the common wiring 8. The wiring edge 6*bx* of the ground wiring 6*b* is located outside of the connecting member 12 in plan view (in the X-Y plane). This arrangement facilitates the propagation of charges associated with electric discharge due to static electricity to the ground wiring 6*b*. The above-mentioned configuration of the common wiring 8, the ground wiring 6*a,* and the ground wiring 6*b* can eliminate or reduce the transmittance of the charges associated with electric discharge due to static electricity to the common wiring 8. This can prevent the occurrence of malfunctions or failures of various circuits (such as the drive circuit 3) connected to the common wiring 8.

In recent years, the liquid crystal displays are finding increased use as vehicle-installed displays included in the car navigation system. The liquid crystal displays are thus required to meet stricter specifications of withstand voltage in tests under electric discharge caused by static electricity. The conventional liquid crystal displays generally have a structure of covering the four sides of the front surface of the liquid crystal panel with the front frame. In recent years, meanwhile, the liquid crystal displays including no front frame (no front-frame structure) are becoming increasingly popular mainly for design purposes or mechanical purposes.

In the liquid crystal displays having the no front-frame structure, charges associated with electric discharge do not migrate to the front frame. In the conventional liquid crystal display employing, for example, the FFS mode or the IPS mode, meanwhile, charges may directly enter the wiring patterns of the array substrate despite the presence of grounded transparent conductive film on the counter substrate. Consequently, the conventional liquid crystal display fails to meet the stricter standards of withstand voltage in recent years, and thus, the liquid crystal display would malfunction due to electric discharge.

This problem can be resolved through the above-mentioned configuration of this preferred embodiment.

In this preferred embodiment, the common wiring 8 and the ground wiring 6*a* located below the sealing material 9 may have slits for allowing ultraviolet rays to pass therethrough. Through the slits, the sealing material 9 can be irradiated with ultraviolet rays emitted from underneath the array substrate 20 in this configuration. The sealing material 9 can be easily cured in the process of manufacturing the liquid crystal panel 50.

As described above, unlike the sealing material 9, which is provided to confine the liquid crystals LQ1, the connecting members 12 are provided to facilitate the propagation of charges associated with electric discharge due to static electricity to the ground wiring 6*b*. In this preferred embodiment, the connecting members 12 may be spacers for leaving the clearance between the array substrate 20 and the counter substrate 21. The spacers may have, for example, a columnar shape.

In this preferred embodiment, the ground wiring 6*a* and the ground wiring 6*b* are provided. That is, two pieces of ground wiring are provided in this preferred embodiment. Alternatively, three or more pieces of ground wiring and two or more spaces containing air may be provided. In such configuration, for example, at least one piece of ground wiring is located between the ground wiring 6*a* and the ground wiring 6*b* in plan view (in the X-Y plane).

Second Preferred Embodiment

In the configuration (hereinafter also referred to as "modified configuration A) of this preferred embodiment, the insulating film 14 has holes. The liquid crystal panel 50 having the modified configuration A applied thereto is hereinafter also referred to as "liquid crystal panel 50A." The liquid crystal display 100 according to this preferred embodiment includes the liquid crystal panel 50A in place of the liquid crystal panel 50 according to the first preferred embodiment.

Figure 5:
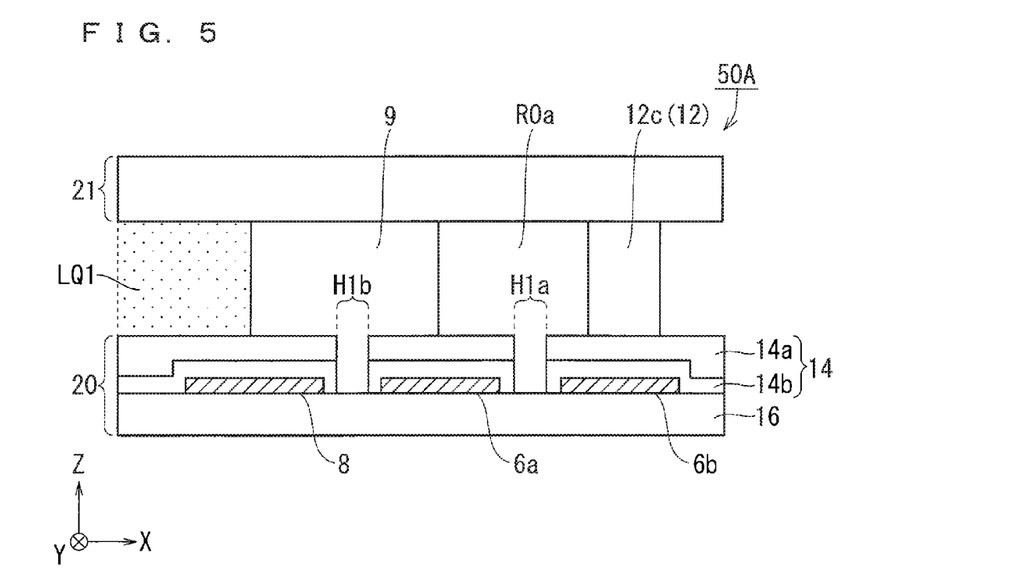
FIG. 5 is a cross-sectional view of a liquid crystal panel according to a second preferred embodiment of the present invention.

FIG. 5 is a cross-sectional view of the configuration of the liquid crystal panel 50A according to a second preferred embodiment of the present invention. FIG. 5 shows the configuration of the liquid crystal panel 50A located in the same position as in FIG. 4. That is, FIG. 5 is a cross-sectional view of the region RL1 in FIGS. 1 and 2 with the application of the modified configuration A.

Unlike the liquid crystal panel 50 in the first preferred embodiment, the liquid crystal panel 50A includes the insulating film 14 having holes H1*a* and H1*b*. The configuration of the liquid crystal panel 50A except for the above is the same as that of the liquid crystal panel 50 in the first preferred embodiment, and the detailed description thereof is not repeated.

In this preferred embodiment, the insulating film 14 has the hole H1*a* in the region between the ground wiring 6*a* and the ground wiring 6*b* such that the air in the space R0*a* is present between the ground wiring 6*a* and the ground wiring 6*b*. The hole H1*a* is provided through the upper-layer insulating film 14*a* and the lower-layer insulating film 14*b*. Thus, the air in the space R0*a* is present between the ground wiring 6*a* and the ground wiring 6*b*.

The insulating film 14 has the hole H1*b* in the region between the common wiring 8 and the ground wiring 6*a* such that a part of the sealing material 9 resides between the common wiring 8 and the ground wiring 6*a*. The hole H1*b* is provided through the upper-layer insulating film 14*a* and the lower-layer insulating film 14*b*. Thus, a part of the sealing material 9 resides between the common wiring 8 and the ground wiring 6*a*.

As described above, the insulating film 14 (the upper-layer insulating film 14*a* and the lower-layer insulating film 14*b*) is made of, for example, a nitride film or an oxide film. The nitride film has a relative dielectric constant equal to or close to 6.7. The oxide film has a relative dielectric constant equal to or close to 4.

In the modified configuration A, the sealing material 9 having a relative dielectric constant smaller than the relative dielectric constant of the insulating film 14 resides between the common wiring 8 and the ground wiring 6*a*. Therefore, in the modified configuration A, the capacitance between the common wiring 8 and the ground wiring 6*a* can be reduced compared to that of the configuration in the first preferred embodiment.

The transmittance of charges that have entered the ground wiring 6*b* to the common wiring 8 can be eliminated or reduced to a greater extent in the modified configuration A than in the configuration of the first preferred embodiment. Consequently, the occurrence of malfunctions or failures of various circuits (such as the drive circuit 3) connected to the common wiring 8 can be prevented more reliably in the modified configuration A than in the first preferred embodiment.

Optionally, in the modified configuration A, the hole H1*a* or the hole H1*b*, but not both, may be provided. In such configuration, the insulating film 14 has a hole (the hole H1*a* or the hole H1*b*) in the region between the ground wiring 6*a* and the ground wiring 6*b* or in the region between the between the common wiring 8 and the ground wiring 6*a*.

In the modified configuration A, the hole H1*a* may be provided only through the upper-layer insulating film 14*a* instead of being provided through the upper-layer insulating film 14*a* and the lower-layer insulating film 14*b*.

In the modified configuration A, the hole H1*b* may be provided only through the upper-layer insulating film 14*a* instead of being provided through the upper-layer insulating film 14*a* and the lower-layer insulating film 14*b*.

Third Preferred Embodiment

In the configuration (hereinafter also referred to as "modified configuration B") of this preferred embodiment, the ground wiring is divided in the thickness direction. The liquid crystal panel 50 having the modified configuration B applied thereto is hereinafter also referred to as "liquid crystal panel 50B." The liquid crystal display 100 according to this preferred embodiment includes the liquid crystal panel 50B in place of the liquid crystal panel 50 according to the first preferred embodiment.

Figure 6:
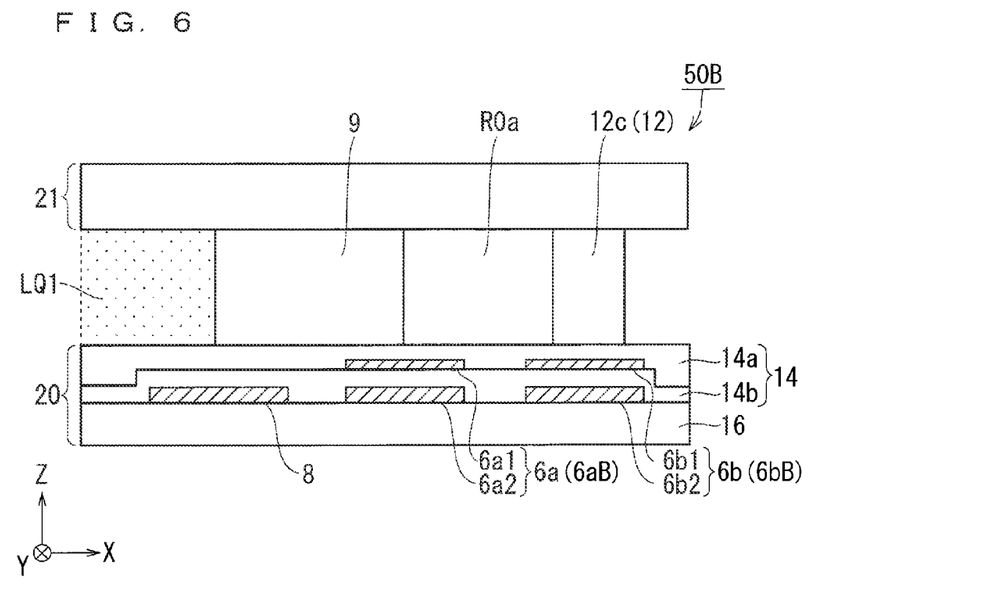
FIG. 6 is a cross-sectional view of a liquid crystal panel according to a third preferred embodiment to the present invention.

FIG. 6 is a cross-sectional view of the configuration of the liquid crystal panel 50B according to a third preferred embodiment of the present invention. FIG. 6 shows the configuration of the liquid crystal panel 50B located in the same position as in FIG. 4. That is, FIG. 6 is a cross-sectional view of the region RL1 in FIGS. 1 and 2 with the application of the modified configuration B.

The liquid crystal panel 50B differs from the liquid crystal panel 50 of the first preferred embodiment in the structure of the ground wiring 6a and the ground wiring 6b. The configuration of the liquid crystal panel 50B except for the above is the same as that of the liquid crystal panel 50 in the first preferred embodiment, and the detailed description thereof is not repeated.

The ground wiring 6a having the modified configuration B applied thereto is hereinafter also referred to as "ground wiring 6aB." The ground wiring 6aB is located as with the ground wiring 6a of the first preferred embodiment. That is, the ground wiring 6aB is located so as to surround the common wiring 8 in plan view (in the X-Y plane).

The ground wiring 6b having the modified configuration B applied thereto is hereinafter also referred to as "ground wiring 6bB." The ground wiring 6bB is located as with the ground wiring 6b of the first preferred embodiment. That is, the ground wiring 6bB is located so as to surround the ground wiring 6aB in plan view (in the X-Y plane).

The ground wiring 6aB is composed of a wire 6a1 and a wire 6a2. The wire 6a1 and the wire 6a2 are stacked in the thickness direction (the Z axis direction). In particular, the wire 6a1 is located in the upper-layer insulating film 14a. The wire 6a2 is located in the lower-layer insulating film 14b. Thus, the wire 6a1 is stacked over the wire 6a2 with the lower-layer insulating film 14b located therebetween.

The wire 6a1 and the wire 6a2 are electrically connected in the array substrate 20. The wire 6a1 and the wire 6a2 are electrically connected through, for example, a contact hole or another wire.

The ground wiring 6bB is composed of a wire 6b1 and a wire 6b2. The wire 6b1 and the wire 6b2 are stacked in the thickness direction (the Z axis direction). In particular, the wire 6b1 is located in the upper-layer insulating film 14a. The wire 6b2 is located in the lower-layer insulating film 14b. Thus, the wire 6b1 is stacked over the wire 6b2 with the lower-layer insulating film 14b located therebetween.

The wire 6b1 and the wire 6b2 are electrically connected in the array substrate 20. The wire 6b1 and the wire 6b2 are electrically connected through, for example, a contact hole or another wire.

As described above, in this preferred embodiment, the ground wiring 6aB and the ground wiring 6bB each include two wires stacked in the thickness direction. The two wires are electrically connected. Thus, the ground wiring 6aB has a resistance value smaller than that of the ground wiring 6a of the first preferred embodiment. The ground wiring 6bB has a resistance value smaller than that of the ground wiring 6b of the first preferred embodiment.

Therefore, the transmission of charges that have entered the ground wiring 6bB (the wire 6b2) to the common wiring 8 can be eliminated or reduced to a greater extent in the modified configuration B than in the configuration of the first preferred embodiment. Consequently, the occurrence of malfunctions or failures of various circuits (such as the drive circuit 3) connected to the common wiring 8 can be prevented more reliably in the modified configuration B than in the first preferred embodiment.

Optionally, in the modified configuration B, only one of the two pieces of ground wiring, but not both, may include two wires stacked in the thickness direction. As an example, the ground wiring 6b of the first preferred embodiment and the ground wiring 6aB including the wire 6a1 and the wire 6a2 may be provided in the modified configuration B. As another example, the ground wiring 6a of the first preferred embodiment and the ground wiring 6bB including the wire 6b1 and the wire 6b2 may be provided in the modified configuration B.

The application of the modified configuration B in this preferred embodiment to the modified configuration A in the second preferred embodiment provides another configuration (hereinafter also referred to as "modified configuration Ab"). For example, in the modified configuration Ab, the configuration in FIG. 6 further includes at least one of the holes H1a and H1b in FIG. 5.

Fourth Preferred Embodiment

In the configuration (hereinafter also referred to as "modified configuration C") of this preferred embodiment, the ground wiring is exposed from the edge portion of the liquid crystal panel. The liquid crystal panel 50 having the modified configuration C applied thereto is hereinafter also referred to as "liquid crystal panel 50C." The liquid crystal display 100 according to this preferred embodiment includes the liquid crystal panel 50C in place of the liquid crystal panel 50 according to the first preferred embodiment.

Figure 7:
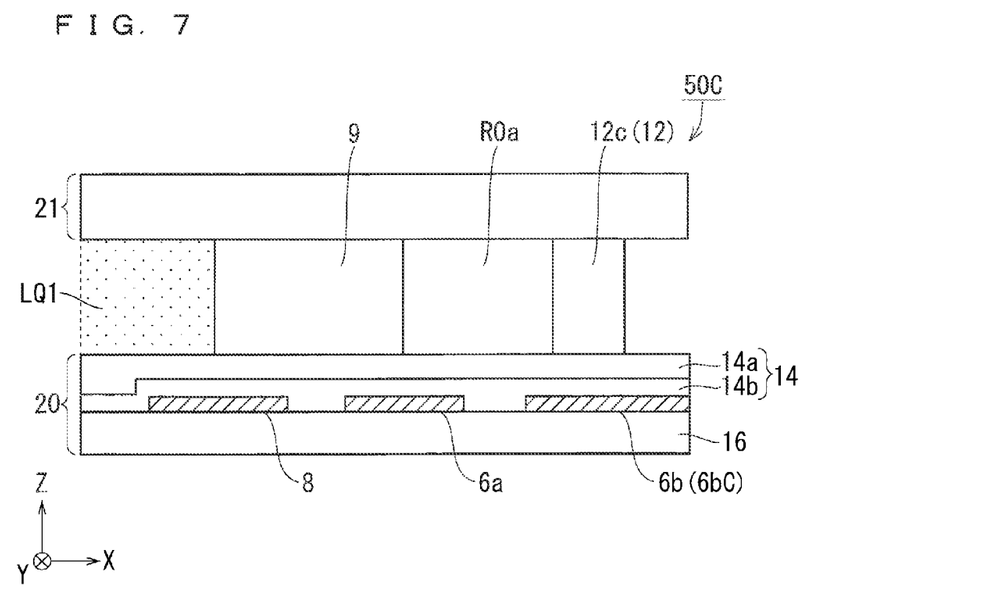
FIG. 7 is a cross-sectional view of a liquid crystal panel according to a fourth preferred embodiment.

FIG. 7 is a cross-sectional view of the configuration of the liquid crystal panel 50C according to a fourth preferred embodiment of the present invention. FIG. 7 shows the configuration of the liquid crystal panel 50C located in the same position as in FIG. 4. That is, FIG. 7 is a cross-sectional view of the region RL1 in FIGS. 1 and 2 with the application of the modified configuration C.

The liquid crystal panel 50C differs from the liquid crystal panel 50 of the first preferred embodiment in the arrangement state of the ground wiring 6b. The configuration of the liquid crystal panel 50C except for the above is the same as that of the liquid crystal panel 50 in the first preferred embodiment, and the detailed description thereof is not repeated. The ground wiring 6b having the modified configuration C applied thereto is hereinafter also referred to as "ground wiring 6bC."

The ground wiring 6bC is exposed, at the edge portion of the liquid crystal panel 50C, to the outside of the liquid crystal panel 50C. In particular, the ground wiring 6bC extends to the end surface of the liquid crystal panel 50C so as to be exposed to the outside from the end surface of the liquid crystal panel 50C on the outer side.

In this configuration, charges associated with electric discharge due to static electricity propagate through the outer edges of the connecting members 12 and the insulating film 14 without directly entering other interconnections, thus being reliably led into the ground wiring 6bC. This configuration can prevent charges from directly entering the ground wiring 6a without passing through the ground wiring 6bC. Consequently, the modified configuration C can prevent the occurrence of malfunctions or failures of various circuits (such as the drive circuit 3) connected to the common wiring 8.

The application of the modified configuration C in this preferred embodiment to the modified configuration A in the second preferred embodiment provides another configuration (hereinafter also referred to as "modified configuration Ac"). The modified configuration Ac is obtained by, for example, replacing the ground wiring 6b in FIG. 5 with the ground wiring 6bC in the configuration of FIG. 5.

The application of the modified configuration C in this preferred embodiment to the modified configuration B in the third preferred embodiment provides still another configuration (hereinafter also referred to as "modified configuration Bc"). The modified configuration Bc is obtained by exposing, at the edge portion of the liquid crystal panel 50B, the wire 6b1 and the wire 6b2 to the outside of the liquid crystal panel 50B in FIG. 6.

The application of the modified configuration C in this preferred embodiment to the modified configuration Ab mentioned above provides yet still another configuration (hereinafter also referred to as "modified configuration Abc"). The modified configuration Abc is obtained by providing at least one of the holes H1a and H1b in FIG. 5 to the modified configuration Bc mentioned above.

In the present invention, the above preferred embodiments can be arbitrarily combined, or each preferred embodiment can be appropriately varied or omitted within the scope of the invention.

For example, the liquid crystal display 100 of any one of the first to fourth preferred embodiments is not limited to the liquid crystal display employing, for example, the FFS mode or the IPS mode. Alternatively, the liquid crystal display 100 may be a liquid crystal display employing the TN mode.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal panel including a display region for displaying image with liquid crystals and a peripheral region located in a periphery of said display region, said liquid crystal panel comprising:
   a first substrate for controlling said liquid crystal panel;
   a second substrate facing said first substrate;
   a sealing material and a connecting member that connect said first substrate and said second substrate;
   common wiring located in said peripheral region and used to drive said liquid crystal panel; and
   first ground wiring and second ground wiring located in said peripheral region and connected to a ground potential, wherein
   on said common wiring, said first ground wiring, and said second ground wiring, an insulating film is located,
   said sealing material and said connecting member are located apart from each other on said insulating film,
   said common wiring, said first ground wiring, and said second ground wiring are located apart from each other in said peripheral region,
   said common wiring and said sealing material are located so as to surround said display region in plan view,
   said liquid crystals are located in a region defined by said first substrate, said second substrate, and said sealing material,
   said first ground wiring is located so as to surround said common wiring in plan view,
   said second ground wiring is located so as to surround said first ground wiring in plan view,
   said connecting member is located so as to surround said sealing material in plan view,
   a wiring edge being an edge of said second ground wiring farthest from said display region resides, in plan view, at a position farther from said display region than an edge of said connecting member farthest from said display region,
   a space is present between said sealing material and said connecting member, said space containing air having a relative dielectric constant smaller than a liquid crystal relative dielectric constant being a relative dielectric constant of said liquid crystals under application of an electric field,
   a first edge portion being a portion of said first ground wiring closest to said second ground wiring and a second edge portion being a portion of said second ground wiring closest to said first ground wiring are in contact with said space through said insulating film,
   said sealing material has a relative dielectric constant smaller than the liquid crystal relative dielectric constant, and
   a third edge portion being a portion of said common wiring closest to said first ground wiring and a fourth edge portion being a portion of said first ground wiring closest to said common wiring are in contact with said sealing material through said insulating film.

2. The liquid crystal panel according to claim 1, wherein said connecting member is another sealing material for connecting said first substrate and said second substrate or a spacer for leaving a clearance between said first substrate and said second substrate.

3. The liquid crystal panel according to claim 1, wherein said liquid crystal panel is controlled by a drive circuit for controlling said liquid crystal panel,
   said liquid crystal panel is connected to a circuit board including a grounding terminal connected to the ground potential,
   said first ground wiring and said second ground wiring are located independent of said drive circuit, and
   said first ground wiring and said second ground wiring are connected to said grounding terminal.

4. The liquid crystal panel according to claim 1, wherein said insulating film has at least one hole in at least one of a region between said first ground wiring and said second ground wiring and a region between said common wiring and said first ground wiring.

5. The liquid crystal panel according to claim 1, wherein said first ground wiring is composed of a first wire and a second wire stacked in a thickness direction, and
   said first wire and said second wire are electrically connected in said first substrate.

6. The liquid crystal panel according to claim 1, wherein said second ground wiring is composed of a third wire and a fourth wire stacked in a thickness direction, and
   said third wire and said fourth wire are electrically connected in said first substrate.

7. The liquid crystal panel according to claim 1, wherein said second ground wiring is exposed, at an edge portion of said liquid crystal panel, to the outside of said liquid crystal panel.

8. A liquid crystal display that controls said liquid crystal panel according to claim 1 to display the image.

* * * * *